(12) United States Patent
Aingaran et al.

(10) Patent No.: US 9,146,879 B1
(45) Date of Patent: Sep. 29, 2015

(54) VIRTUAL MEMORY MANAGEMENT FOR REAL-TIME EMBEDDED DEVICES

(71) Applicant: Ambarella, Inc., Santa Clara, CA (US)

(72) Inventors: Kathirgamar Aingaran, San Jose, CA (US); Leslie D. Kohn, Saratoga, CA (US); Robert C. Kunz, Sunnyvale, CA (US); Jenn-Yuan Tsai, Cupertino, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

(21) Appl. No.: 14/496,121

(22) Filed: Sep. 25, 2014

Related U.S. Application Data

(60) Division of application No. 14/202,276, filed on Mar. 10, 2014, now Pat. No. 8,868,883, which is a continuation of application No. 12/725,899, filed on Mar. 17, 2010, now Pat. No. 8,694,755.

(51) Int. Cl.
*G06F 12/02* (2006.01)
*G06F 12/10* (2006.01)

(52) U.S. Cl.
CPC ...... *G06F 12/1027* (2013.01); *G06F 2212/651* (2013.01)

(58) Field of Classification Search
CPC .................................................. G06F 12/1036
USPC .......................................................... 711/206
See application file for complete search history.

(56) References Cited

U.S. PATENT DOCUMENTS

| 4,538,241 A | 8/1985 | Levin et al. | 711/207 |
| 5,918,251 A * | 6/1999 | Yamada et al. | 711/207 |

* cited by examiner

*Primary Examiner* — Yong Choe
(74) *Attorney, Agent, or Firm* — Christopher P. Maiorana, PC

(57) ABSTRACT

An apparatus comprising an arbiter circuit, a translation circuit and a controller circuit. The arbiter circuit may be configured to generate one or more first control signals and a data write signal in response to an input signal and a read data signal. The translation circuit may be configured to generate a one or more second control signals in response to the one or more first control signals and the write address signal. The controller circuit may be configured to generate an address signal in response to the one or more second control signals.

19 Claims, 4 Drawing Sheets

VIRTUAL MEMORY MANAGEMENT FOR REAL-TIME EMBEDDED DEVICES

This application relates to U.S. Ser. No. 14/202,276, filed Mar. 10, 2014, which relates to U.S. Ser. No. 12/725,899, filed Mar. 17, 2010, now U.S. Pat. No. 8,694,755, which are incorporated by reference in their entirety.

FIELD OF THE INVENTION

The present invention relates to memory management generally and, more particularly, to a method and/or architecture for implementing virtual memory management in real-time embedded devices.

BACKGROUND OF THE INVENTION

Conventional mobile devices increasingly serve many functions such as cellular phone calling, internet or wi-fi access, general purpose graphical applications, video and/or image processing. Each of these applications use system resources differently. Future devices are expected to integrate even more features. Such new features will likely add new types of resource requirements and memory patterns.

Application-specific integrated circuits include special-purpose hardware units to accelerate critical functions within such hybrid systems. Such hardware units coexist on the same integrated circuit and share a common pool of systems resources. A host processor typically acts as a resource manager by allocating memory for each unit, reclaiming unused or free memory, providing security to prevent unauthorized access to memory contents, and managing power usage. Depending on the overall system requirements, the resource manager can also operate as a collection of host processors.

Conventional operating systems use virtual memory to provide a single interface to each program. Such an approach provides the illusion to the client of having a contiguous block of memory addresses. However, the addresses are fragmented in a physical storage device (i.e., DRAM, FLASH card, or an external storage devices, etc.). Virtual memory systems translate virtual memory addresses to physical memory accesses via virtual to physical table lookups.

Modern virtual memory systems are sometimes separate virtual and physical memory into blocks of a fixed or variable size called pages. When a program accesses a new virtual page, the host processor accesses the page table to translate the virtual page number (VPN) to a physical page number (PPN) to construct the physical address and access the correct location in memory. Page-table lookups are time-intensive operations. Modern processors provide a cache of virtual to physical translations for the host-processor. This cache is sometimes referred to as an address translation cache or translation look-aside buffer (TLB).

Clients also need to access physical memory, either to perform specific functions or to execute proxy transfers for the host (i.e., Direct Memory Access (DMA)). If clients access physical storage through virtual memory, such clients need to access the TLB directly or to keep shadow copies of the TLB entires locally to keep the mapping tables of the various clients consistent. In both cases, clients use a page table lookup operation to find new pages or pages no longer found in the TLB. Communication occurs from the host to the clients when the host changes virtual to physical translations.

However, clients often have real-time deadlines that must be met to operate properly. These deadlines are especially important in digital image and video processing, medical devices, aeronautical systems, automobiles or other mechanical control systems where real-time deadlines are critical. Missing a deadline in these cases can lead to image corruption, data inaccuracies, or other system errors with disastrous consequences. Memory space used by these devices does not generally fit in the TLB exclusively (i.e., page table lookups are needed when page-table entries are not found in the buffer).

Clients with real-time constraints typically cannot leverage TLBs because a page-table access is too expensive and unpredictable. Too many page table lookups can stall the client, potentially causing a missed deadline. Modern real-time systems attempt to solve this problem by supporting physical-only memory accesses exclusively or splitting physical storage between physical-only access for clients and virtual-only memory access for general-purpose applications.

The first approach drops key benefits of virtual memory. The second approach creates a sub-optimal allocation of system storage because the division is static and cannot easily adjust if the system migrates from running general-purpose applications to real-time applications or visa versa.

It would be desirable to implement a host processor to provide the benefits of virtual memory while allowing real-time clients to meet performance deadlines.

SUMMARY OF THE INVENTION

The present invention concerns an apparatus comprising an arbiter circuit, a translation circuit and a controller circuit. The arbiter circuit may be configured to generate one or more first control signals and a data write signal in response to an input signal and a read data signal. The translation circuit may be configured to generate a one or more second control signals in response to the one or more first control signals and the write address signal. The controller circuit may be configured to generate an address signal in response to the one or more second control signals.

The objects, features and advantages of the present invention include providing a memory management system that may (i) operate with real-time embedded devices, (ii) allow clients to manage one or more particular resources without access to a host processor, (iii) provide virtual memory access to all clients in the system, regardless of real-time deadlines, (iv) create a common intermediate translation memory space that may be partitioned by a host and/or (v) introduce a virtual space for clients of the host processor to manage according to a current work set.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may relate to a system on a chip with a main host processor managing a collection of specialized functional units or coprocessors. The specialized functional units may have different resources and/or access memory in unique ways. The techniques and implementation described allow an individual client to manage one or more particular memory resources without needing access to the host processor.

The present invention may implement a host processor to provide virtual memory access to some or all of the clients in the system, regardless of real-time deadlines. Management of the timing of page table lookups may be controlled either by the host or by one or more of the individual clients. The host may set aside a segment of virtual memory for use by the client and may maintain a page table of VPN to PPN translations for the virtual segment in a physical storage device, similar to typical virtual memory systems.

Unlike a translation lookaside buffer or an address translation cache, the present invention may create a common intermediate translation memory space that a host partitions into segments. The segments may be independently accessible by each client. An address translation table (ATT) may be implemented to hold the mapping from the translation memory space to the physical memory space. The size of the translation memory space is normally determined by multiplying the number of entries in the translation table by the page size. If the translation memory space is larger than the entries in the ATT, then each client maps a portion of a respective segment into the ATT. The size of the memory space is determined by the number of CVPN bits in the ATT. In addition, each client may have an ATT and a respective ATT address space.

The individual clients may control the exact mapping of a respective virtual segment to physical memory by updating entries in the address translation table depending on current working sets. Such a transfer of control may allow the client to explicitly manage timing of expensive page table lookup operations.

The present invention may introduce a virtual space for clients of the host processor to manage according to a current working set. The host may partition the virtual space for each client into separate segments usable for each respective client. In one embodiment, the virtual space may be universal among all clients and/or may be separate from the virtual memory space of processes running on the host. Alternative virtual memory approaches include implementing separate virtual address spaces for subsets of the clients and/or implementing one virtual space per client.

Figure 1:
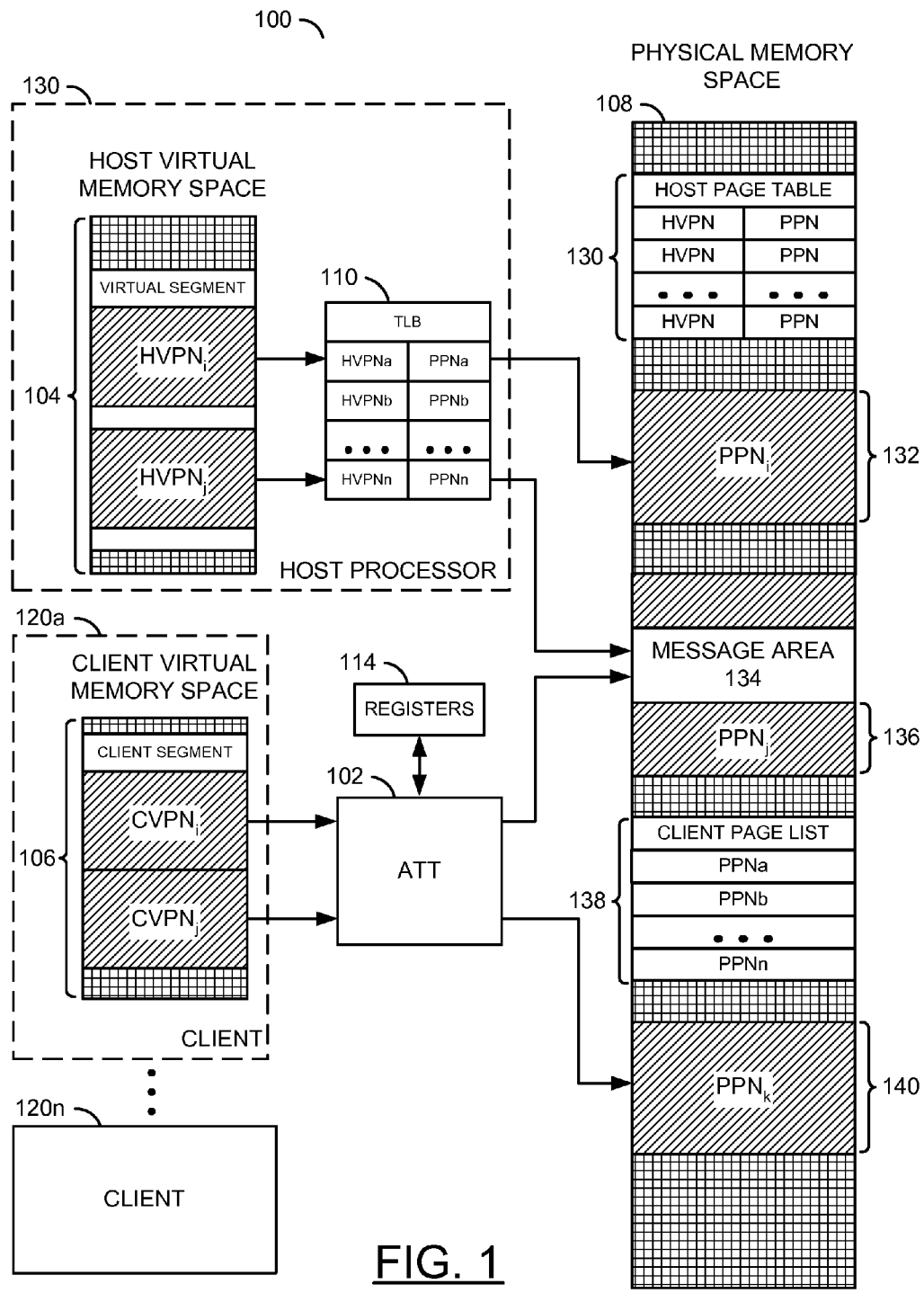
FIG. 1 is a diagram illustrating three key address spaces used to allow clients to manage individual virtual memory spaces.

Referring to FIG. 1, a diagram of a memory arrangement 100 is shown. The arrangement 100 includes an address translation table (ATT) 102, a memory space 104, a memory space 106, a memory space 108, and a translation look aside buffer (TLB) 110. The memory space 104 may be implemented as a host virtual memory space. The memory space 106 may be implemented as a client virtual memory space. The memory space 108 may be implemented as a physical memory space. The address translation table 102 may be implemented in hardware, software, or a combination of hardware and/or software. A number of clients 120a-120n may access the client virtual memory space. The address translation table 102 may be located on a chip that maps the virtual pages of the clients 120a-120n to physical pages in the address translation table 102. A host 130 (or host processor) may access the host virtual memory space. The individual clients 120a-120n may index the address translation table 102 with a virtual page number (CVPN) of a particular client to find the corresponding physical page number (PPN) of the physical memory space 108. The physical memory space 108 generally comprises a host page table 130, a PPN section 132, a message area 134, a PPN area 136, a client page list 138, and a PPN area 140.

The virtual-to-physical lookup of the buffer 110 may operate in parallel to a memory organization protocol used by the host processor 130. The particular addressing protocol used by the host processor 130 may be implemented using a variety of techniques. The virtual-to-physical look-up of the buffer 110 may be implemented in addition to the memory organization protocol used by the host processor 130. The host processor 130 may translate host virtual page numbers (HVPN) to physical page numbers (PPN) using traditional virtual memory. The host processor 130 may also access the physical memory 108 directly without a virtual memory scheme.

Communication between the host processor 130 and the clients 120a-120n (to be described in more detail in connection with FIG. 2) may occur through point-to-point connections, messages through a proxy, sharing a message area 134 in physical storage visible to both the host processor 130 and the clients 120a-120n, etc. Communication through the physical memory 108 may be implemented by one of the clients 120a-102n accessing the physical memory space 108 directly, by bypassing the ATT 102, or by mapping the message area 134 to a virtual page within a segment of the physical memory space 108. In the latter case, the host processor 130 may also map one or more physical pages in the message area 134 to the virtual memory space 104 of the host processor 130. Both the host processor 130 and the clients 120a-120n need to clear updates or writes to the message area 134 in the physical memory space 108 for communication to occur. Caching and/or buffering by either the host 130 or one or more of the clients 120a-120n hides the communication. A snoop protocol, message passing protocol, a direct wire communication, or any other mechanism to send updates to the clients 120a-120n from the host 130, or visa versa, may be implemented. Such a protocol may avoid the communicating agents (either the host 130 or one or more of the clients 120a-120n) from repeatedly polling the content of the memory 108 to detect new messages. For example, the page PPNj (136) may be used to communicate, since both the clients 120a-120n and the host 130 may access the page PPNj (136).

The memory arrangement 100 may include a number of registers 114. The registers 114 store a configuration state for client segments and the CVPN-to-PPN mappings. The registers 114 may be accessible in the physical address space. In one example, the registers 114 may be implemented as specialized control registers rather than general purpose registers found on a processor. The mapping may be a function of the content of the registers 114 and the address translation table 102. One or more of the clients 120a-120n may have physical-only access. One or more of the clients 120a-120n may snoop and/or read the control registers 114 for debugging, to aid communication, or for another adaptive operation. One or more of the clients 120a-120n may also read the mappings from another one of the clients 120a-120n to determine translations. In one operating mode of the memory arrangement 100, the host processor 130 may allocate a segment within the virtual memory space 106 when enabling a particular one of the clients 120a-120n. The host processor 130 may then generate a list of physical pages for use by the particular one of the clients 120a-120n. The physical pages (e.g., 132, 136, 140, etc.) may not need to be contiguously located in the physical storage 108. The host processor 130 may communicate to each of the clients 120a-120n the range of the virtual segments used for each of the clients 120a-120n and the list of physical pages (e.g., 132, 136, 140, etc.) to use.

Once the host processor 130 finishes the configuration, the selected one of the clients (e.g., 120a) maps physical pages in a current working set to a particular CVPN page (e.g., CVPNa) in a virtual segment (e.g., PPNa). The client 120a may then update the ATT 102 with each new CVPN-to-PPN mapping. The columns shown in the ATT 102 illustrate the CVPN-to-PPN mapping. The client 120a then uses virtual addresses to access physical storage 108. As the current working set changes over time, the client 120a may free virtual pages that are no longer in the working set and may update the freed entries of the ATT 102 to map new physical pages. The client 120a may hold a small set of page lists within the ATT 102 and may control the timing of working set changes. The host processor 130 may be configured to leave the physical page list of a particular one of the clients 120a-120n unchanged until the client completes execution or acknowledges a release request of the list. In general, the host page table list 130 and client page list 138 in the physical memory space 108 will be larger than the storage of the TLB 110 and the ATT 102.

A particular client (e.g., 120a) may manage the client segment. Other clients (e.g., 120b-120n) or the host processor 130 may also manage the client segment on behalf of the client 120a. Client segment managers should normally have read and write access to the registers 114 to change the client 120a table entries in the ATT 102. The page list PPNa-PPNn (138) may be shared with the client segment manager. In one example, the page list PPNa-PPNn (138) may be globally visible to the clients 120a-120n or exclusively shared with the client segment managers.

In another operating mode, the clients 120a-120n may access the physical memory 108 directly and bypass the lookup in the ATT 102. The clients 120a-120n operating in this mode may be referred to as physical clients. The clients 120a-120n operating as physical clients do not access the virtual memory 106. By contrast, the clients 120a-120n operating as virtual clients may access the ATT 102 to translate virtual addresses to the physical memory 108.

The arrangement may cover the described operating modes for any of the clients 120a-120n. The host processor 130 may select the operating mode for each of the clients 120a-120n by setting controller registers in the memory controller (to be described in more detail in connection with FIG. 2). These registers may allow a user to select the type of memory access that best fits each of the needs of each of the particular clients 120a-120n.

Figure 2:
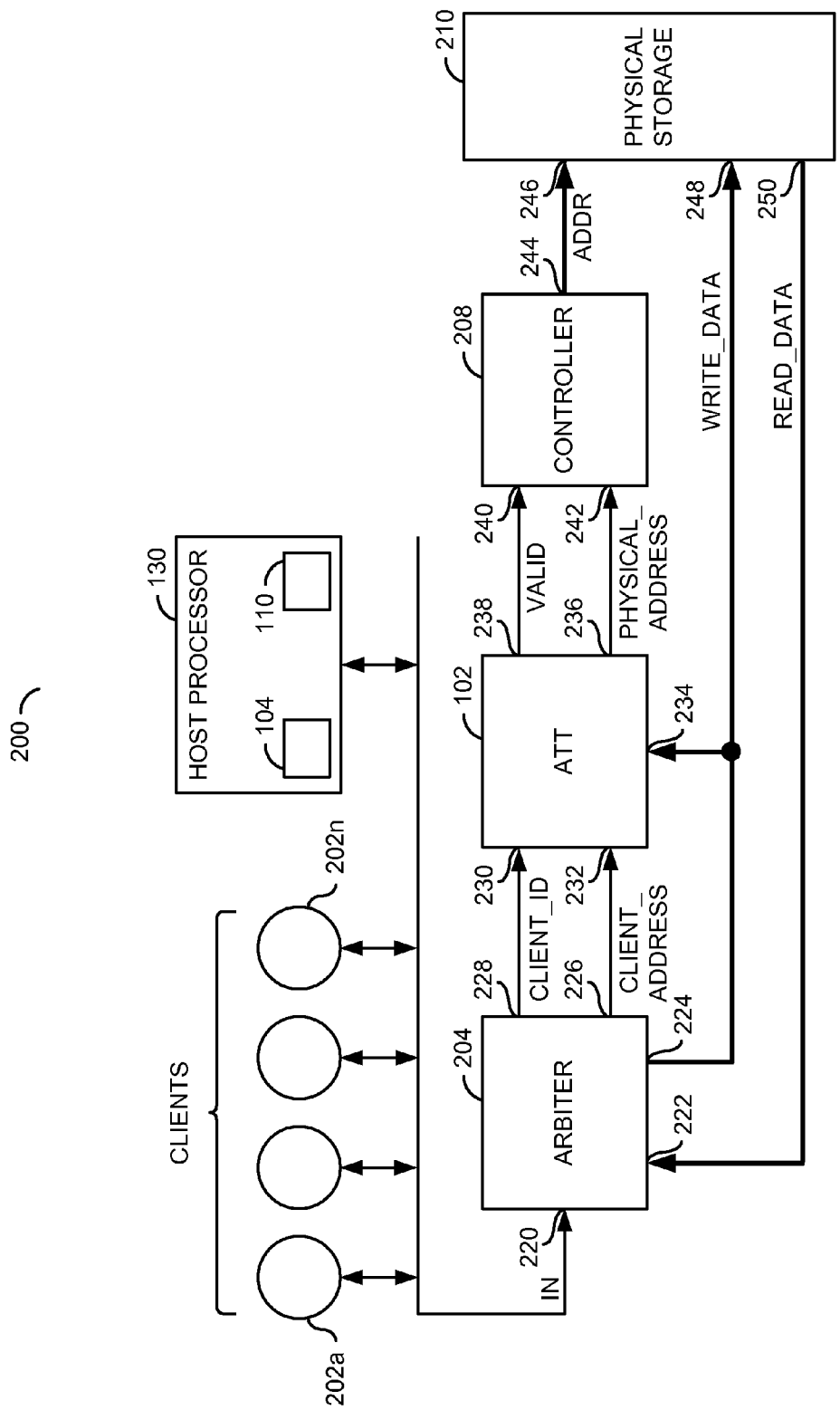
FIG. 2 is a block diagram illustrating the placement of the ATT lookup table in a DRAM controller.

Referring to FIG. 2, a block diagram of a system 200 is shown in accordance with an embodiment of the present invention. The system 200 generally comprises a number of clients 202a-202n, a block (or circuit) 204, a block (or circuit) 102, a block (or circuit) 208, and a block (or circuit) 210. The circuit 204 may be implemented as an arbiter circuit. The circuit 102 may be implemented as an address translation table circuit. The circuit 208 may be implemented as a controller circuit. The circuit 210 may be implemented as a physical storage device. The circuit 210 generally corresponds to the memory 108 of FIG. 1. The clients 202a-202n generally correspond to the clients 102a-102n of FIG. 1. The circuit 204 may have an input 220 that may receive a signal (e.g., IN), an input 222 that may receive a signal (e.g., READ_DATA), an output 224 that may present a signal (e.g., WRITE_DATA), an output 226 that may present a signal (e.g., CLIENT_ADDRESS), and an output 228 that may present a signal (e.g., CLIENT_ID).

The circuit 102 may have an input 230 that may receive the signal CLIENT_ID, an input 232 that may receive the signal CLIENT_ADDRESS, an input 234 that may receive the signal WRITE_DATA, an output 236 that may present a signal (e.g., PHYSICAL_ADDRESS), and an output 238 that may present a signal (e.g., VALID).

The circuit 208 may have an input 240 that may receive the signal VALID, an input 242 that may receive the signal PHYSICAL_ADDRESS, and an output 244 that may present a signal (e.g., ADDR). The circuit 210 may have an input 246 that may receive the signal ADDR, an input 248 that may receive the signal WRITE_DATA, and an output 250 that may present the signal READ_DATA.

The system 200 illustrates how the memory arrangement 100 interfaces with other components in a typical controller used to access the offchip memory 210. The clients 202a-202n may send a request for physical storage to the arbiter 204 using a virtual address. The arbiter 204 may then choose which request to schedule based on a predetermined scheduling scheme. The arbiter 204 may then send the signal CLIENT_ID and CLIENT_ADDRESS to the ATT circuit 102. The ATT circuit 102 may then construct the signal PHYSICAL_ADDRESS from this information and may mark the signal VALID as valid or invalid depending on the signal CLIENT_ADDRESS. The controller 208 may then send the signal ADDR to the physical storage 210, discard invalid requests and update error status registers accordingly. The translation may also occur before arbitration. In this case, the ATT 102 may be part of one or more of the clients 202a-202n. In such an implementation, the ATT 102 may be restricted to generating physical accesses when communicating with the arbiter 204 and/or controller 208. The clients 202a-202n are not generally restricted from using virtual memory internally. The controller 208 does not normally perform address translations.

The ATT circuit 102 may support both virtual and physical clients. Physical clients access physical memory directly (e.g., without translation) and virtual clients access an address translation table to translate the virtual page number (CVPN) of a particular client 202a-202n to a physical page number (PPN). Virtual client accesses may be guarded by a CVPN base and an upper bound. The ATT circuit 102 may mark any access above or below the bounds as invalid, signal the controller 208 to prevent the invalid access (either a read or a write) from accessing the physical memory 210, and/or send an interrupt to the host processor 130 for error handling. The host processor 130 may enable, disable, and/or ignore interrupts generated by segmentation violations. In physical clients, the CVPN may be equal to the PPN.

Figure 3:
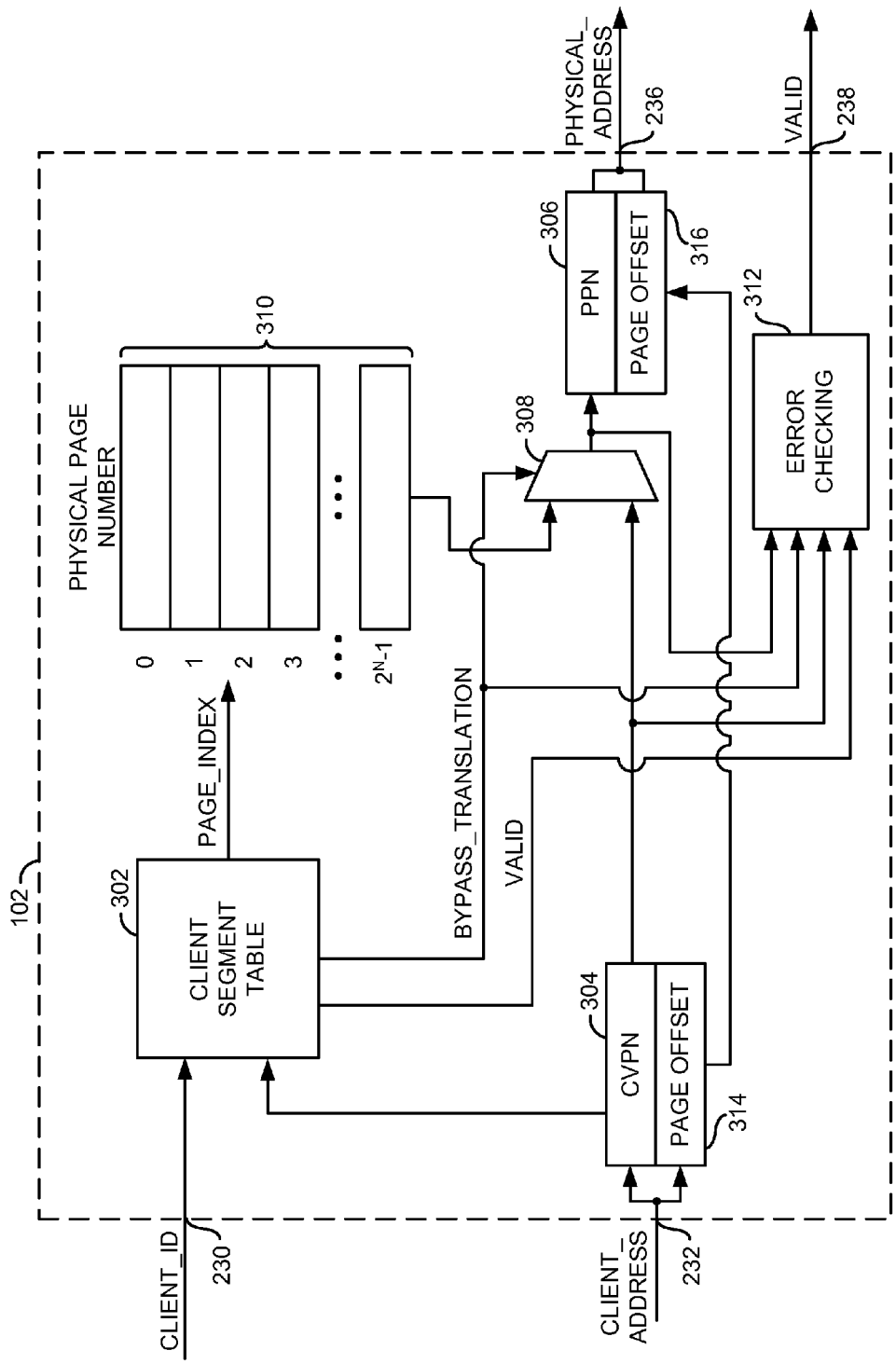
FIG. 3 is a block diagram illustrating a CVPN to PPN lookup table within the ATT.

Referring to FIG. 3, a more detailed diagram of the ATT circuit 102 is shown illustrating the process of translating a CVPN to a PPN. The ATT circuit 102 generally comprises a block (or circuit) 302, a block (or circuit) 304, a block (or circuit) 306, a block (or circuit) 308, a block (or circuit) 310, a block (or circuit) 312, a block (or circuit) 314, and a block (or circuit) 316. The circuit 302 may be implemented as a client segment table. The circuit 304 may be configured to store a CVPN. The circuit 306 may be implemented as a block configured to store a PPN. The circuit 308 may be implemented as a selection circuit. The circuit 310 may be implemented as a page number table. The circuit 312 may be implemented as an error checking circuit. The circuit 314 may be implemented as a page offset. The circuit 316 may be implemented as a page offset.

When one of the clients 202a-202n accesses the memory 210, the particular client (e.g., 202a) may issue a memory request to the arbiter 204, which forwards the request to the ATT circuit 102. The new request arrives as a block of data including a unique identifier of the particular client 202a and a virtual address, separated into the CVPN 304 and the page offset 314 into the current page. The page offset 314 normally remains unchanged from the CVPN 304 to the PPN 306, thus the pages offset field typically remains constant. The ATT 102 may use the client ID to lookup the entry of the client 202a in the client segment table 118 (to be described in more detail in connection with FIG. 4). The ATT 102 may also check for valid access. If a bypass bit is set (to be described in more detail in connection with FIG. 4), the client 202a has physical access privileges and the CVPN equals the PPN without translation or access privilege checking. If the bypass bit is not set, and the CVPN is valid, the ATT 102 uses the CVPN to index the physical page number table 310 and read the new PPN if the CVPN falls within the virtual segment of the particular client 202a.

The memory arrangement 100 may include an optional error status state to indicate to the host processor 130 that an illegal access has occurred. Error status registers, violation address registers, and violation client ID registers may be implemented to provide the type of invalid access, the address that accessed memory outside of its segment, and/or the client ID that generated the invalid access respectively. The memory arrangement 100 may cover scenarios that may occur when the memory arrangement 100 records no invalid access, a single invalid access, or a list of invalid accesses. The memory arrangement 100 may replace and/or supplement other virtual memory implementations. If an error occurs during a memory access, such as an invalid CVPN, the error checking circuit 312 may record the error in an error status register contained within the error checking circuit 312. In addition, the error status register may record the CVPN 304, the PPN 306 and/or the ID of the client that caused the error. The error checking circuit 312 may also generate an error interrupt to the host processor 130. Recording errors and generating an error interrupt to the host processor 130 may be used for error recovery or for debugging purposes.

An access privilege may also be specified on a per memory request basis. For example, the bypass bit may be stored as a field in the memory request. Memory requests with the bypass bit set may act as a physical client. Such a per-request control may replace or act in conjunction with the per-client bypass bit.

The PPN table 310 may be controlled by either the host 130 or one of the clients 120a-120n. Each of the clients 120a-120n in the address translation table 102 may optionally include an enable bit in addition to a bypass bit. One or more of the clients 120a-120n may be disabled. Such a disabled one of the clients 120a-120n may still use the ATT 102, but may copy the value of the CVPN block 304 to the PPN block 306 and not provide range checking of addresses. The disabled virtual clients 120a-120n may act like physical clients. The resulting value stored in the PPN block 306 may then be recombined with the page offset 316 to form a physical address to access physical storage 210 or the registers 114.

The ATT 102 may contain a fixed number of entries. The number of entries may restrict how many mappings the clients 202a-202n may buffer without implementing a pagetable lookup. The signals CLIENT_ID and CLIENT_ADDRESS may be used to determine if a potential new access to the memory 108 (or 210) is a virtual access or a physical access (e.g., using the signal BYPASS_TRANSLATION). If the new access is virtual, the signal PAGE_INDEX may determine which entry contains the VPN to PPN mapping in the ATT 102. This calculation may be done by looking up the client segment table 302. The signal PAGE_INDEX may be the address of the correct physical page number for the virtual page number of a requestor within the ATT 102. The PPN block 306 may receive the physical page number, the data returned by reading the signal PAGE_INDEX address within the ATT table 102. The access of the ATT table 102 may occur whether the translation is valid or not. For example, if the bypass bit is set, the entry read from the ATT 102 may be ignored. Such an operation may be determined by the following equation EQ1:

$$PPN = \text{if(bypass) CVPN else ATT[PAGE\_INDEX]};\qquad\text{EQ1}$$

Figure 4:
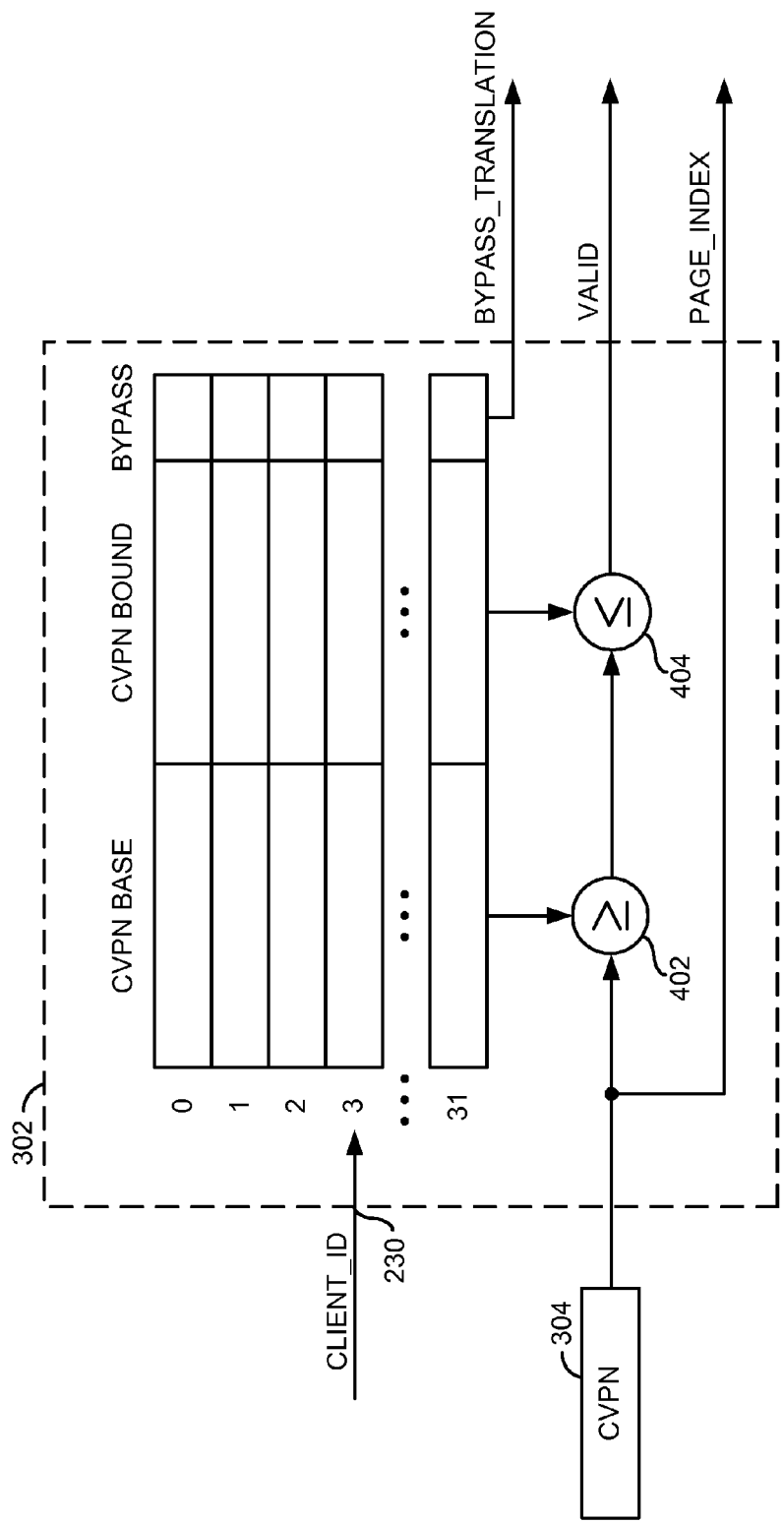
FIG. 4 is a block diagram illustrating the client segment table programmed by the host processor.

Referring to FIG. 4, a more detailed diagram of the client segment table 302 is shown. The client segment table 302 generally comprises a CVPN base column, a CVPN bound column, a bypass column, a block (or circuit) 402 and a block (or circuit) 404. The circuit 402 may be implemented as a greater than logic circuit. The circuit 404 may be implemented as a greater than logic circuit. The client segment table 302 may hold access privileges (e.g., virtual, physical, etc.) as the signal VALID and a range of each virtual segment of a particular client 202a-202n. The signal VALID is invalid if the virtual address is outside the range of the virtual segment. If one of the clients 202a-202n does not have direct access to the ATT 102, the host 130 or another one of the clients 202a-202n that has access to the ATT 102 may control the client virtual memory space 106 by sending updates to the ATT 102. The host processor 130 may allocate a segment of the client virtual memory space 106 for a new one of the clients 202a-202n and then determine the access privilege of each of the clients 202a-202n.

The CVPN base bits may correspond to the starting address of the segment. The CVPN bound bits may be the CVPN base plus the size of the segment. The bypass bit, which is part of the registers 114, is generally set true (e.g., ON) if a particular one of the clients 202a-202n is physical. The bypass bit is generally set false (e.g., OFF) if a particular one of the clients 202a-202n is virtual. The registers 114 are memory mapped to a portion of the physical memory space 108. When the ATT 102 receives a translated or non-translated physical access, the physical access is not sent to the physical storage 108. Instead, the registers 114 within the ATT 102 are utilized. The host processor 130 normally also has access to the same memory mapped portion to control the ATT 102 properly. Therefore, the host 130 then sends the bypass bits to the client segment table 302 by issuing a store operation to the registers 114.

In one example, the bypass bit column may be implemented in a separate register (not shown). In another example, if none of the clients 202a-202n need direct physical access, the bypass bit may not be needed. The particular polarity of the bypass bit may be varied to meet the design criteria of a particular implementation.

The client segment table 302 may use greater than or less than logic in the blocks 402 or 404 to check for "in range" accesses. Alternative implementations of the client segment table 302 may include using a base address and a size to specify a particular client segment. If a particular access is invalid, the calculated physical page number may be ignored or recorded as a segmentation violation address. For example, the translation may be calculated to determine whether the access is invalid or not.

The various signals of the present invention are generally "on" (e.g., a digital HIGH, a "true" or 1) or "off" (e.g., a digital LOW, a "false" or 0). However, the particular polarities of the on (e.g., asserted) and off (e.g., de-asserted) states of the signals may be adjusted (e.g., reversed) to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    an interface configured to receive a request to access a memory in a physical memory space, wherein (i) said request has a virtual address in a virtual memory space and an identifier of a client that made said request, and (ii) said virtual address has a virtual page number; and
    a circuit configured to (i) generate a physical page number based on both said virtual page number and said identifier, and (ii) generate a physical address in said physical memory space by replacing said virtual page number with said physical page number, wherein a contiguous sequence of said virtual page numbers is translated into a non-contiguous sequence of said physical page numbers.

2. The apparatus according to claim 1, wherein said circuit is further configured to address a table with said identifier to read a bypass flag.

3. The apparatus according to claim 1, wherein said physical page number is (i) read from a table of said circuit in response to a bypass flag having a non-bypass state and (ii) copied from said virtual page number in response to said bypass flag having a bypass state such that said client accesses said physical memory space directly.

4. The apparatus according to claim 1, wherein generation of said physical page number is further based on said virtual page number addressing a table of said circuit.

5. The apparatus according to claim 1, wherein said circuit is further configured to (i) separate an offset in said virtual address from said virtual page number and (ii) generate said physical address by combining said physical page number with said offset.

6. The apparatus according to claim 1, wherein said circuit is further configured to address a table with said identifier to read a first page number and a second page number.

7. The apparatus according to claim 1, wherein said circuit is further configured to compare said virtual page number to a first page number and a second page number to generate a signal that indicates whether said request is valid or invalid.

8. The apparatus according to claim 1, wherein said physical page number is generated while said client is enabled.

9. The apparatus according to claim 1, wherein said virtual memory space comprises a client virtual memory space.

10. A method for virtual memory management, comprising the steps of:
    (A) receiving a request at an interface of a circuit to access a memory in a physical memory space, wherein (i) said request has a virtual address in a virtual memory space and an identifier of a client that made said request, and (ii) said virtual address has a virtual page number;
    (B) generating a physical page number based on both said virtual page number and said identifier; and
    (C) generating a physical address in said physical memory space by replacing said virtual page number with said physical page number, wherein a contiguous sequence of said virtual page numbers is translated into a non-contiguous sequence of said physical page numbers.

11. The method according to claim 10, further comprising the step of:
    addressing a table with said identifier to read a bypass flag.

12. The method according to claim 10, wherein said physical page number is (i) read from a table in response to a bypass flag having a non-bypass state and (ii) copied from said virtual page number in response to said bypass flag having a bypass state such that said client accesses said physical memory space directly.

13. The method according to claim 10, wherein generation of said physical page number is further based on said virtual page number addressing a table.

14. The method according to claim 10, further comprising the step of:
    separating an offset in said virtual address from said virtual page number, wherein said physical address is further generated by combining said physical page number with said offset.

15. The method according to claim 10, further comprising the step of:
    addressing a table with said identifier to read a first page number and a second page number.

16. The method according to claim 10, further comprising the step of:
    comparing said virtual page number to a first page number and a second page number to generate a signal that indicates whether said request is valid or invalid.

17. The method according to claim 10, wherein said physical page number is generated while said client is enabled.

18. The method according to claim 10, wherein said virtual memory space comprises a client virtual memory space.

19. An apparatus comprising:
    means for receiving a request to access a memory in a physical memory space, wherein (i) said request has a virtual address in a virtual memory space and an identifier of a client that made said request, and (ii) said virtual address has a virtual page number;
    means for generating a physical page number based on both said virtual page number and said identifier; and
    means for generating a physical address in said physical memory space by replacing said virtual page number with said physical page number, wherein a contiguous sequence of said virtual page numbers is translated into a non-contiguous sequence of said physical page numbers.

* * * * *